United States Patent [19]

Rasmussen

[11] Patent Number: 4,919,042
[45] Date of Patent: Apr. 24, 1990

[54] APPARATUS FOR THE BREAKING OF EGGS AND THEIR SEPARATION INTO YOLK AND ALBUMEN

[75] Inventor: Hans Kristian L. Rasmussen, Morud, Denmark

[73] Assignee: Sanovo Engineering A/S, Odense, Denmark

[21] Appl. No.: 286,729

[22] Filed: Dec. 20, 1988

[30] Foreign Application Priority Data

Oct. 4, 1988 [DK] Denmark .............................. 5534/88

[51] Int. Cl.[5] .......................... A23J 1/09; A47J 43/14
[52] U.S. Cl. ......................................... 99/499; 99/497
[58] Field of Search ................................... 99/495–500, 99/568, 581, 582, 577, 578, 472; 426/490, 614, 480, 479, 478; 406/151, 168

[56] References Cited

U.S. PATENT DOCUMENTS

| | | | |
|---|---|---|---|
| 2,818,096 | 12/1957 | Willsey | 99/500 |
| 3,324,911 | 6/1967 | Sakai | 99/498 |
| 3,417,798 | 12/1968 | Shelton | 99/498 |
| 4,110,223 | 8/1978 | McAleer et al. | 99/498 |
| 4,137,838 | 2/1979 | Warren | 99/500 |
| 4,534,284 | 8/1985 | Fujimura et al. | 99/500 |
| 4,773,322 | 9/1988 | Willsey | 99/499 |

Primary Examiner—Timothy F. Simone
Attorney, Agent, or Firm—Wegner & Bretschneider

[57] ABSTRACT

In an apparatus for the breaking of eggs and separation of yolk and albumen, and of the kind comprising a supply conveyor, a washing and flushing system and a breaking mechanism positioned at one end of the conveyor and having a considerable number of egg stations each capable of receiving and holding one egg at the time, and with separate containers of yolk and albumen, the eggs stations are arranged for successively passing the conveyor to receive eggs and continue through a closed path along which working stations are provided for control of the separation of yolk and albumen, their collection in separate ducts or containers and removal of empty egg shells. A working station for removal of shells comprises a valve-controlled compressed air supply for blowing off the shells from shell holder means in each egg station, and a conical scavenging duct for reception and removal of the off-blown egg shells, said duct being combined with an air sluice and means to provide a sub pressure for secure removal of residual albumen.

4 Claims, 2 Drawing Sheets

APPARATUS FOR THE BREAKING OF EGGS AND THEIR SEPARATION INTO YOLK AND ALBUMEN

BACKGROUND OF THE INVENTION

This invention relates to an apparatus for the breaking of eggs and separation of yolk and albumen, and of the kind comprising a supply conveyor, a washing and flushing system for washing the eggs passing by on the conveyor and an egg breaking mechanism positioned at one end of the conveyor and having a considerable number of egg stations each capable of receiving and holding one egg at the time, and with separate containers for yolk and albumen, the egg stations being arranged for successively passing by the conveyor to receive their eggs and continue through a closed path along which working stations are provided for control of the separation of yolk and albumen, their collection in separate ducts or containers and removal of empty egg shell fractions, a working station for removal of shell fractions comprising a valve-controlled compressed air supply means for blowing off the shell fractions from holder means in each egg station, and a conical scavenging duct for reception and further removal of the blown-off egg shell fractions.

Such apparatus are widely used at the production of egg-products requiring separate treatment of yolk and albumen, or whenever yolk and albumen are to be used in different products.

Prior art apparatus of this type have a high capacity, e.g. 25,000 eggs/hour.

In some cases where such installations have been housed in less than well-ventilated localities, the service personel in these localities may risk exposure to allergy reactions.

Investigations have shown, that these allergy reactions presumably have been caused by the presence of atomized albumen proteins in the air in these localities, and the purpose of the invention is to provide an installation which substantially remedies this problem.

SUMMARY OF THE INVENTION

For the foregoing reasons, an apparatus according to the invention includes a receptor end of the scavenging duct in the shell removal station is positioned near the shell holder means of the egg stations passing by, and that an air sluice (i.e., evacuation chamber) and means to provide a sub-pressure (i.e., air suction) communicate with an outlet end of the scavenging duct.

The invention is based on the recognition, that the predominant cause for the possible presence of atomized albumen proteins in the air of the locality is the use of pressurized (i.e., compressed) air for blowing off the shell fractions from the individual egg stations. This may cause the severance of the residue of albumen which unavoidably remains in the otherwise emptied shells.

Through the invention a sub-pressure is provided in the scavenging duct of the shell removal station, e.g. by connecting to said air sluice a mechanically ventilated exhaust duct and by suitably proportioning the magnitude of the sub-pressure in relation to the speed of the blown-off shell fractions the atomized albumen particles may be efficiently sucked off.

In view of a certain, although minor risk of severance of albumen particles also present in the washing and flushing system, as a residue of albumen may often remain on the outside of the shells of eggs supplied due to a prior contact with crushed or broken eggs, a preferred embodiment of the installation according to the invention has a further improvement wherein a mechanically ventilated exhaust duct is connected with a substantially closed washing cabin in the washing and flushing system.

Through this additional measure the risk of a contamination of the ambient air with atomized albumen particles is nearly completely avoided, and at the same time the content of albumen in the flush from the washing cabin is substantially reduced. It may even, possibly after a further purification, be recycled into the washing cabin.

BRIEF DESCRIPTION OF THE DRAWINGS

The invention will now be described in more detail with reference to the accompanying schematical drawings in which FIG. 1 schematically shows the main features of an embodiment of an egg treatment installation accorto the invention.

DETAILED DESCRIPTION

Figure 1:
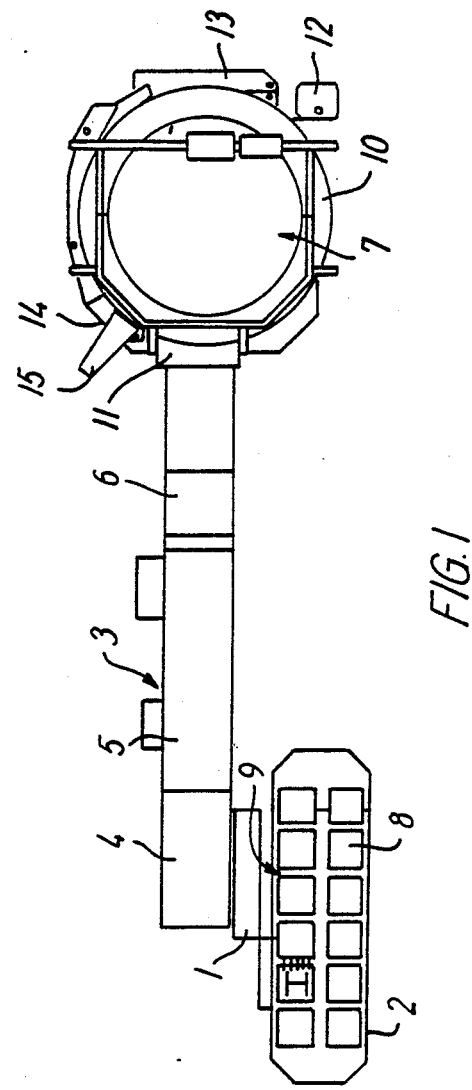
Figure 2:
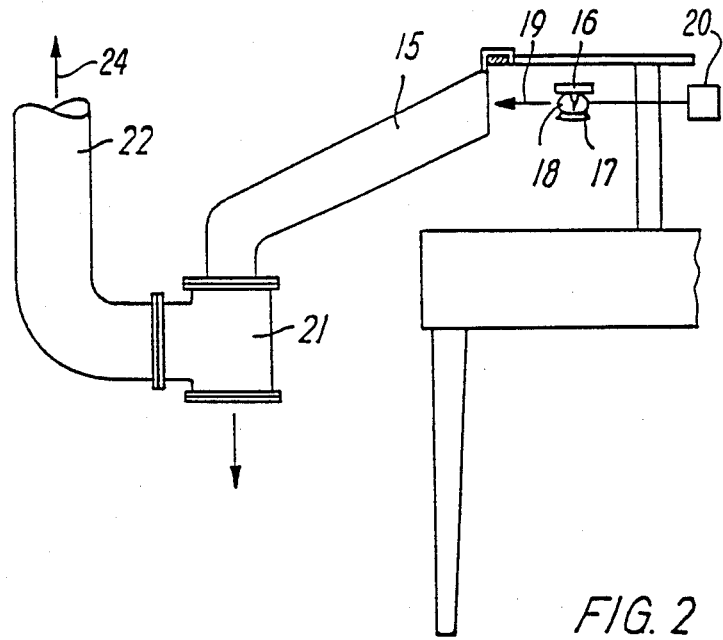
FIG. 2 shows more details of an embodiment of a shell removal device.

In the embodiment of the invention shown in FIG. 1, a supply conveyor 3 comprises an egg deposit section 4, a washing cabin 5, and a candling part 6 for the detection and removal of possibly damaged or rotten eggs. At one end of the conveyor 3 at the egg deposit section 4, an egg lifting installation 1 is positioned between the conveyor 3 and a table 2 for egg trays, said lifting installation lifting in one operation all eggs from a tray 8, provided this tray has the correct position 9, and takes the eggs to the egg deposit section 4 of the conveyor.

At its opposite end the conveyor 3 joins an egg breaking mechanism 7 which in a manner known per se comprises a considerable number of individual egg stations, not shown in all details, but being arranged in the present embodiment as a roundabout (i.e., turntable) which e.g. may comprise 80 individual egg stations.

Each egg station comprises in a known manner a knife assembly for the breaking of the egg shell into fractions (halves) and separate receptors for yolk and albumen. During the passage past the conveyor 3 a number of eggs, e.g. 6, positioned in a row transverse to the conveyor are transferred in one operation to a corresponding number of egg stations aligned with an egg supply station 11 of the roundabout 10 in the breaking mechanism 7.

During continued rotation, the roundabout 10 leads the egg stations past an inspection station 12 for the control of the separation of yolk and albumen, a collecting station 13, where the yolk and albumen from the separate containers of the individual stations are transferred to separate collecting ducts, and finally a shell removal station 14 positioned immediately before the supply station 11 in the direction of the rotation. Here the egg shell fractions are blown off the holders in the individual stations by pressurized air 19 from supply means 20, whereby the shells are blown into the inlet end of the conical scavenging duct 15.

The shell fractions 18 kept in the shell holders 16, 17 of an egg station are blown off by pressurized air and thus brought into the conical scavenging duct 15.

According to the invention the duct 15 has its receiving end near the shell holders of the egg stations passing by.

According to the invention an air sluice 21 is attached to the outlet end of the scavenging duct 22 15 and is coupled to a mechanically ventilated exhaust duct.

Through the suction 24 in the duct 22 produced by means of a suitable axial or centrifugal flow fan, a subpressure is provided in the air sluice 21 for the removal of isolated albumen particles in the duct 15 through the exhaust duct 22.

Figure 3:
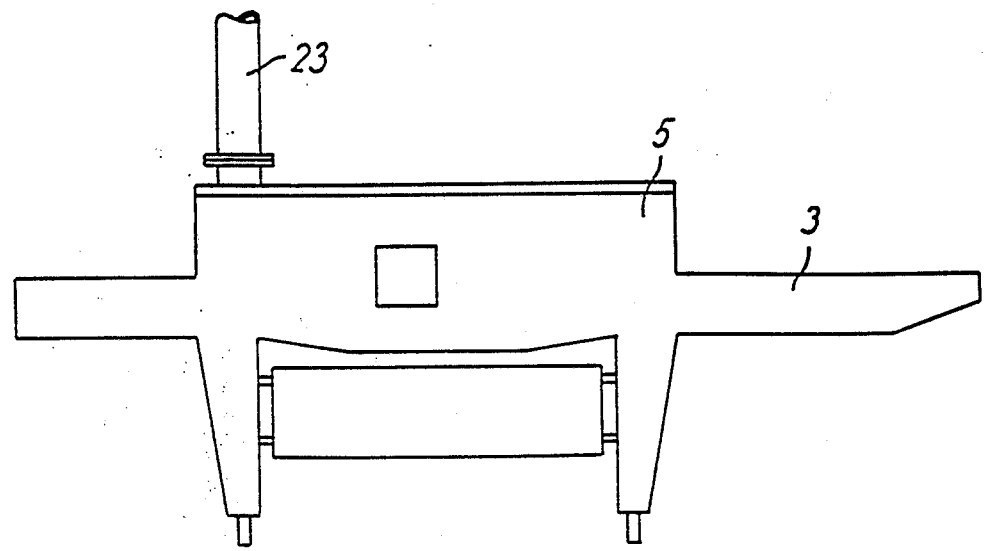
FIG. 3 shows details of an embodiment of a washing cabin.

As apparent from FIG. 3 the washing cabin 5 may also be provided with a mechanically ventilated exhaust duct 23 for the sucking off of albumen particles removed from the outside of the egg shells during the washing operation.

I claim:

1. An apparatus for breaking eggs and separating yolk and albumen, comprising a supply conveyor, a washing and flushing system for washing eggs on the conveyor, an egg breaking mechanism at one end of the conveyor having a plurality of egg stations, each said egg station having means for receiving and holding one egg at a time, breaking the egg shell and separating yolk and albumen, means for successively passing the egg stations by the conveyor to receive eggs and continue through a closed path, and a working station along the closed path for control of the separation of yolk and albumen, separate collection of yolk and albumen and removal of empty shell fractions, wherein the working station comprises pressurized air supply means for blowing off the shell fractions from the holding means of the egg stations and a scavenging duct for receiving blown-off shell fractions, the improvement comprising the scavenging duct of the working station having an inlet end positioned near the holding means of the egg stations passing by and an outlet end, and an air sluice having one end communicating with means for providing air suction, said air sluice having another end connected to the outlet end of the scavenging duct.

2. An apparatus as recited in claim 1, wherein said means for providing air suction comprises a mechanically ventilated exhaust duct.

3. An apparatus as recited in claim 2, the improvement further comprising a substantially closed washing cabin in said washing and flushing system, and a mechanically ventilated exhaust duct connected with said washing cabin.

4. An apparatus for breaking eggs and separating yolk and albumen, comprising a supply conveyor, a washing and flushing system for washing eggs on the conveyor, an egg breaking mechanism at one end of the conveyor having a plurality of egg stations, each said egg station having means for receiving and holding one egg at a time, breaking the egg shell and separating yolk and albumen, means for successively passing the egg stations by the conveyor to receive eggs and continue through a closed path, and a working station along the closed path for control of the separation of yolk and albumen, separate collection of yolk and albumen and removal of empty shell fractions, wherein the working station comprises pressurized air supply means for blowing off the shell fractions from the holding means of the egg stations and a scavenging duct for receiving blown-off shell fractions, the improvement comprising the scavenging duct of the working station having an inlet end positioned near the holding means of the egg stations passing by and an outlet end, an air sluice having one end communicating with means for providing air suction, said air sluice having another end connected to the outlet end of the scavenging duct, and a substantially closed washing cabin in said washing and flushing system, and a mechanically ventilated exhaust duct connected with said washing cabin.

* * * * *